(12) United States Patent
Keil et al.

(10) Patent No.: US 10,433,147 B2
(45) Date of Patent: *Oct. 1, 2019

(54) METHOD AND SYSTEM FOR ASSESSING THE SAFETY OF A USER OF AN APPLICATION FOR A PROACTIVE RESPONSE

(71) Applicant: Life360, Inc., San Francisco, CA (US)

(72) Inventors: Dylan Keil, Menlo Park, CA (US); Charlie Kubal, San Francisco, CA (US); Alexander Haro, Las Vegas, NV (US)

(73) Assignee: Life360, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/125,501

(22) Filed: Sep. 7, 2018

(65) Prior Publication Data
US 2019/0007820 A1    Jan. 3, 2019

Related U.S. Application Data

(63) Continuation of application No. 15/487,343, filed on Apr. 13, 2017, now Pat. No. 10,104,527.

(51) Int. Cl.
*H04W 4/90* (2018.01)
*H04L 29/08* (2006.01)
(Continued)

(52) U.S. Cl.
CPC ............ *H04W 4/90* (2018.02); *G08B 21/025* (2013.01); *G08B 21/0258* (2013.01);
(Continued)

(58) Field of Classification Search
CPC ......... H04W 4/22; H04W 4/021; H04W 4/90; H04W 4/02; H04W 4/025; H04W 4/028; H04W 76/007; H04W 76/50; H04W 4/029; H04W 76/023; H04W 76/14; H04M 1/72536; H04M 1/72552; H04M 2242/04; H04M 2242/30; H04L 67/18; H04L 67/22
(Continued)

(56) References Cited

U.S. PATENT DOCUMENTS 8,588,733 B2    11/2013    Ferguson et al.
8,624,727 B2    1/2014    Saigh et al.
(Continued)

FOREIGN PATENT DOCUMENTS

WO    WO-2011/060335    5/2011

*Primary Examiner* — Timothy X Pham
(74) *Attorney, Agent, or Firm* — Womble Bond Dickinson (US) LLP

(57) ABSTRACT

A method for assessing a safety of a user of an application executing on a mobile device, including collecting a location data, a motion data, and a location data source from the application; transmitting, at a time, the location data, the motion data, and the location data source to a server; obtaining, from the server, a normal behavior data associated with the user; determining an abnormality score; determining a confidence score; determining a threat score; determining a threat type; calculating a safety score for the user; determining that the safety score is less than a safety score threshold; and transmitting a message to the mobile device of the user requesting a reply.

28 Claims, 3 Drawing Sheets

(51) Int. Cl.
*G08B 25/00* (2006.01)
*H04W 68/00* (2009.01)
*H04W 4/021* (2018.01)
*H04L 12/58* (2006.01)
*G08B 21/02* (2006.01)
*G08B 25/01* (2006.01)
*H04M 1/725* (2006.01)
*G08B 21/04* (2006.01)
*H04W 4/029* (2018.01)

(52) U.S. Cl.
CPC ......... *G08B 25/005* (2013.01); *G08B 25/014* (2013.01); *H04L 51/02* (2013.01); *H04L 51/30* (2013.01); *H04L 67/18* (2013.01); *H04L 67/22* (2013.01); *H04W 4/021* (2013.01); *H04W 68/005* (2013.01); *G08B 21/0407* (2013.01); *H04L 51/32* (2013.01); *H04M 1/72538* (2013.01); *H04M 1/72552* (2013.01); *H04W 4/029* (2018.02)

(58) Field of Classification Search
USPC ...................................................... 455/404.2
See application file for complete search history.

(56) References Cited

U.S. PATENT DOCUMENTS

| | | | |
|---|---|---|---|
| 8,805,707 B2 | 8/2014 | Schumann, Jr. et al. | |
| 9,014,661 B2 | 4/2015 | deCharms | |
| 2008/0077474 A1 | 3/2008 | Dumas et al. | |
| 2008/0094230 A1 | 4/2008 | Mock et al. | |
| 2011/0213628 A1* | 9/2011 | Peak | G06Q 40/08 705/4 |
| 2012/0123806 A1* | 5/2012 | Schumann, Jr. | G08G 1/096775 705/4 |
| 2013/0040661 A1* | 2/2013 | Grube | H04W 8/22 455/456.3 |
| 2014/0120863 A1 | 5/2014 | Ferguson et al. | |
| 2014/0350970 A1* | 11/2014 | Schumann, Jr. | G08G 1/096775 705/4 |
| 2015/0365423 A1* | 12/2015 | Prokopi | G06F 21/316 713/152 |
| 2016/0092469 A1* | 3/2016 | Mukherjee | G06Q 10/10 705/325 |
| 2016/0134644 A1* | 5/2016 | Chan | H04L 67/18 726/7 |

* cited by examiner

METHOD AND SYSTEM FOR ASSESSING THE SAFETY OF A USER OF AN APPLICATION FOR A PROACTIVE RESPONSE

CROSS-REFERENCE TO RELATED APPLICATIONS

This application is a continuation of U.S. patent application Ser. No. 15/487,343 filed Apr. 13, 2017, the disclosure of which is incorporated by reference herein.

FIELD

The invention relates to system and method for assessing the safety of a user of an application for a proactive response.

BACKGROUND

Often, an individual will be in a dangerous situation and will not have any means by which to alert others of the danger to that person's self. Examples of these situations may include walking in a dangerous neighborhood at night alone, driving in a deserted area, or even being located in a normally safe location with unusual safety concerns (e.g. extreme weather conditions such as a hurricane, a wild fire, or an earthquake). There may be situations in which the person might not be able to make a phone call due to benign circumstances (e.g. intermittent network access) or dangerous circumstances (e.g. a criminal is stalking the person on the street). In these situations, an individual in danger may not have access to help or emergency responders.

BRIEF DESCRIPTION OF DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

Figure 1:
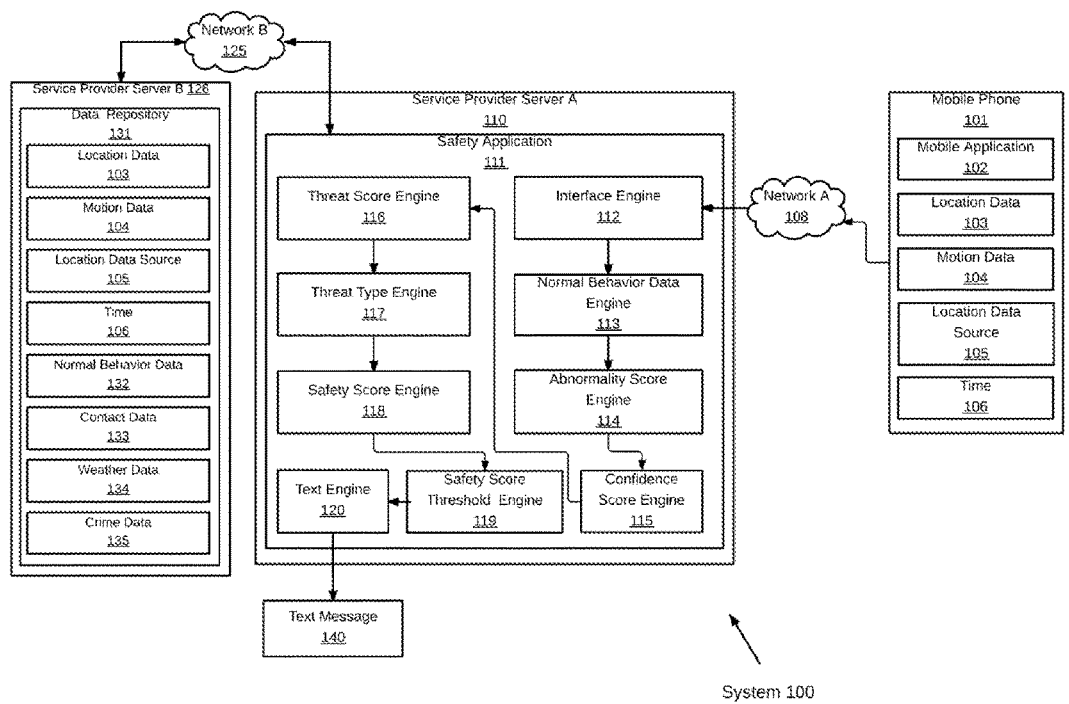
FIG. 1 shows an exemplary block representation of a system for assessing safety of a user of an application for a proactive response in accordance with one or more embodiments of the invention.

In the following description, numerous specific details are set forth. However, it is understood that embodiments of the invention may be practiced without these specific details. In other instances, well-known circuits, structures, and techniques have not been shown to avoid obscuring the understanding of this description.

In the description, certain terminology is used to describe features of the invention. For example, in certain situations, the terms "component," "unit," "module," "engine" and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

In general, embodiments of the invention provide a system and method for assessing a safety of a user of an application executing on a mobile device (e.g., a mobile phone). Specifically, the user may have downloaded and/or activated the application on their mobile phone, and when the user is in any situation which might pose danger to the user, or might be abnormal for the user, the application may assess the safety of the user.

Currently, if someone wants to check on the safety of a loved one, it typically requires proactively checking-in (especially outside of the home). This could take the form of a phone call, a text message or using an application to see their current location. This form of check-in requires the person checking-in to be constantly checking (otherwise they might miss something). This can be stressful and unnerving (e.g. staying up late and constantly checking the location of a loved one on your phone). Furthermore, the current manual check-in usually only captures a moment in time (e.g. "where are you?") and only part of the context. It doesn't have a full historical sense as to whether current context is truly abnormal and/or dangerous. Additionally, if a user does not have someone checking in on them (e.g. a user who is by himself/herself), the user cannot automatically initiate a response in a dangerous scenario (e.g. an individual is running in a dangerous neighborhood by himself late at night, and he may want the application to recognize this is highly abnormal and alert authorities).

The invention includes a mobile phone application that uses passively collected data (e.g. location history, phone usage, and other historic data) to compute a safety score for a registered and tracked individual. For example, if it is detected that a family member is in a location where the family member is unlikely to be located and where there's a high crime rate, a low safety score is assigned to that family member and is shared with other family members as an incentive to check up on that person.

The value of the score could be used to take certain actions proactively. In low safety score situations, the user is contacted at intervals to check if he's OK via an application (such as the checking application), if he says he is safe the safety score of the individual could be incremented, if not or if he doesn't answer, the score is lowered and eventually when a threshold is reached it is used to initiate other actions, like possibly alerting other family members that something is wrong and contacting the authorities for help. Of note is that the alert may be proactive (e.g. the system actually pushes vs. requiring the user to pull the notification or message), the proactive alert may be sent to other people's electronic devices (e.g. family members, or authorities), the alert may be based on analysis of current context and/or historical context (e.g. not just that Johnny is in a dangerous neighborhood, but he also hasn't been there before), and there is no additional hardware required outside of the user's electronic device (e.g., phone), so the invention may function in any location (not just in the car or home).

The invention may be also used to understand historic user behavior, and then proactively suggesting a change in that behavior. For example, the invention may be used for marketing and/or advertising to prompt a user to go to the gym when he forgets to. Additionally, if a user is taking a large number of pictures, and his location indicates that he is traveling, then the system may be used to prompt the user to share something on his social network. At a broad level, the invention may facilitates social sharing by understanding behavioral changes, and then suggesting changes to a user. The application, and how it assesses the safety of the user will be discussed further in the descriptions of FIGS. 1 and 2.

FIG. 1 shows a system (100) in accordance with one or more embodiments of the invention. As shown in FIG. 1, the system (100) includes components such as mobile phone (101), service provider server A (110), safety application (111), and service provider server B (126). These components are described below and may be located on the same device (e.g. a server, multiple servers located in the Cloud, a mainframe, a desktop Personal Computer (PC), a laptop, a Personal Digital Assistant (PDA), a telephone, a mobile phone, a kiosk, a cable box, and any other device) or may be located on separate devices connected by a network (e.g. the Internet, a wide area network (WAN), or a local area network (LAN)), with wired and/or wireless segments. In one or more embodiments of the invention, there may be more than one safety application running on a device, as well as more than one service provider server and/or mobile phone interfacing with those components. Note that with respect to the instant invention, a "Service Provider" is a provider of the subject safety application and any related data or functionality, as opposed to a "Cellular Service Provider" which entity is always involved in the functioning of any mobile or cellular phone. In one embodiment, the service provider server A (110) and service provider server B (126) may be a same single server.

In one or more embodiments of the invention, mobile phone (or mobile electronic device) (101) is configured to store a mobile application (102). Mobile application (102) may be used to assess the safety of the user of the mobile phone (101). The mobile application (102) may also exist in other forms. For example, mobile application (102) may be incorporated into the operating system of the mobile phone (101). Mobile phone (101) may further contain location data (103), which identifies the location of the user at any point in time (e.g. using GPS, cell tower, Wi-Fi triangulation, or other methods). Mobile phone (101) may further contain motion data (104), which identifies the direction of motion, velocity, and acceleration of the user at any point in time. Motion data (104) may also identify any other type of information relating to motion of the user. Mobile phone (101) may further contain location data source (105), which identifies the source of the location data (e.g. GPS, cell tower). Mobile phone (101) may further contain time data (106), which identifies the time associated with various events and other data tracked by the mobile application (102). Mobile phone (101) may transmit these data elements to safety application (111) through network A (108). Those skilled in the art will appreciate that mobile phone (101) may be any mobile device with functionality to store, manipulate, and or transfer each of the described data elements (e.g. a mobile tablet).

In one or more embodiments of the invention, a service provider server A (110) is configured to host a safety application (111), which is configured to assess the safety of the user of the mobile application (102). The safety application (111) is a software application that includes several engines configured to perform specific functions to assess the safety of the user. Specifically, engines operating as part of the safety application (111) may include functionality to identify normal behavior data, create an abnormality score, create a confidence score, create a threat score, create a threat type score, create a safety score, compare the safety score with a safety score threshold, and initiate contact with people in the network of the user or emergency authorities, and perform other calculations associated with assessing the safety of the user. The safety application (111) contains an algorithm that is executed using the data relating to the user, as well as potentially data from other sources (e.g. crime data or extreme weather data). The algorithm may identify behavior that is abnormal (e.g. strong deviation from typical for that specific user) and potentially unsafe (e.g. in a high crime area). The algorithm may contain a feedback mechanism where it may be automatically improved based on a user's responses to its results.

The safety application (111) may receive input from various sources, including mobile phone (101), and mobile application (102). The safety application (111) may store data in and/or access data from a data repository (131). The service provider server A (110), the safety application (111), and other data stored on the service provider server A (110) may be owned and/or operated by a service provider (e.g. the owner, developer, and/or manager of the safety application (111)). The safety application (111) may include engines such as an interface engine (112), a normal behavior data engine (113), an abnormality score engine (114), a confidence score engine (115), a threat score engine (116), a threat type engine (117), a safety score engine (118), a safety score threshold engine (119), and a text engine (120). Each engine of the safety application (111) is described below. Those skilled in the art will appreciate that each of the engines described may have other functionality beyond that disclosed, and that the functionality of each engine may alternatively be performed by any of the other engine or be combined with the functionality of another engine. For example, in one embodiment a degree of confidence may be included in the generation of an abnormality score without having a separate confidence score or confidence score engine. The data flow shown within safety application 111 of FIG. 1 is exemplary, and in fact for some embodiments of the invention certain engines may not be necessary or be optional. Each engine shown may for some embodiments operate based on the output of one or more of the other engines, while for other embodiments some engines may operate on raw data such as location and motion without receiving input from another engine.

In one or more embodiments of the invention, an interface engine (112) is configured to act as an interface between the mobile phone (101) and the safety application (111). The interface engine (112) may receive various data including location data (103), motion data (104), location data source (105), and time data (106) from the mobile phone (101) and the mobile application (102). After receiving the data, the interface engine (112) may process (i.e. modify, transform, format) the data, and then transmit the data to the normal behavior data engine (113) for further processing. In parallel, the interface engine (112) may pass control of the system (100) to any other engine. Those skilled in the art will appreciate that the interface engine (112) may receive data from other entities beyond the mobile phone (101) and the mobile application (102), and may perform other functions beyond those disclosed.

In one or more embodiments of the invention, a normal behavior data engine (113) is configured to determine a normal behavior data (132) associated with the user. The normal behavior data (132) is data that is collected around the movement, location, and time of actions of a user. For example, if a user typically arrives home from school at 5:00 pm and doesn't drive later than 10:00 pm, and they are driving at 3:00 am, this may be identified as a deviation from normal behavior data (132), and might trigger an alert. As another example of a deviation from normal behavior data (132), if a user is running at 2:00 am, and this is a deviation from his normal behavior, this may raise a flag and trigger an alert. Typically, any type of deviation from the normal behavior data (132), such as aggressive acceleration or movement while running or driving might trigger a warning in the system. Normal behavior data (132) is used to understand the normal routines of a user, and therefore to understand when the user is not at a safe location (e.g. home, work, school).

The normal behavior data engine (113) may receive normal behavior data (132) from the data repository (131), or another source. The repository containing the normal behavior data may be physically located on a server or in the Cloud, on the user's phone, or split among these in some manner. After receiving the normal behavior data (132), the normal behavior data engine (113) may process (i.e. modify, transform, format) the normal behavior data (132), and then transmit the normal behavior data (132) to the abnormality score engine (114) for further processing. In parallel, the normal behavior data engine (113) may pass control of the system (100) to any other engine. Those skilled in the art will appreciate that the normal behavior data engine (113) may receive the normal behavior data (132) from other entities beyond the data repository (131), and may perform other functions beyond those disclosed.

In one or more embodiments of the invention, an abnormality score engine (114) is configured to determine an abnormality score. The abnormality score may be derived from the location data (103), the motion data (104), and the normal behavior data (132). The abnormality score identifies how much the current situation of the user deviates from the norm (e.g. based on the normal behavior data (132)). For example, if the user goes to a dangerous location every Tuesday because he has a scheduled meeting (e.g., volunteering work), not this would not be considered abnormal, even though the location may be identified as dangerous. The abnormality score engine (114) may receive the location data (103), the motion data (104), and the normal behavior data (132) from the mobile phone (101), the mobile application (102), and/or the data repository (131). After receiving this data, the abnormality score engine (114) may process (i.e. modify, transform, format) the location data (103), the motion data (104), and the normal behavior data (132), and then transmit this data to the confidence score engine (115) for further processing. In parallel, the abnormality score engine (114) may pass control of the system (100) to any other engine. Those skilled in the art will appreciate that the abnormality score engine (114) may receive the location data (103), the motion data (104), and the normal behavior data (132) from other entities beyond the mobile phone (101), the mobile application (102), and/or the data repository (131), and may perform other functions beyond those disclosed.

In one or more embodiments of the invention, a confidence score engine (115) is configured to determine a confidence score. The confidence score may be derived using the location data (103), the motion data (104), and the location data source (105). The confidence score describes the quality of the data. For example, there may be various degrees of quality associated with location data from different sources such as cell towers vs. GPS satellites (~1500 meter sample vs. ~5 meter sample). The location data (103) derived from a cell tower may have a low confidence score associated with it, whereas location data (103) derived from a GPS satellite may have a high confidence score associated with it. In other words, the confidence score indicates how much the data can be trusted. Lower quality data generates a lower confidence score, whereas higher quality data generates a higher confidence score, which also has a bigger effect on the ultimate safety score.

The confidence score engine (115) may receive the location data (103), the motion data (104), and the location data source (105) from the mobile phone (101), and/or the mobile application (102). After receiving the data, the confidence score engine (115) may process (i.e. modify, transform, format) the location data (103), the motion data (104), and the location data source (105), and then transmit these data to the threat score engine (116) for further processing. In parallel, the confidence score engine (115) may pass control of the system (100) to any other engine. Those skilled in the art will appreciate that the confidence score engine (115) may receive the location data (103), the motion data (104), and the location data source (105) from other entities beyond the mobile phone (101), and/or the mobile application (102), and may perform other functions beyond those disclosed.

In one or more embodiments of the invention, a threat score engine (116) is configured to determine a threat score. The threat score may be derived using the location data (103), the motion data (104), and the time data (106). The threat score is indicates the degree to which something is a threat. For example, a low threat may indicate a relatively safe situation, whereas a high threat score may indicate an extremely dangerous situation. The threat score engine (116) may receive the location data (103), the motion data (104), and the time data (106) from the mobile phone (101), and/or the mobile application (102). After receiving the data, the threat score engine (116) may process (i.e. modify, transform, format) the location data (103), the motion data (104), and the time (106), and then transmit these data to the threat type engine (117) for further processing. In parallel, the threat score engine (116) may pass control of the system (100) to any other engine. Those skilled in the art will appreciate that the threat score engine (116) may receive the location data (103), the motion data (104), and the time data (106) from other entities beyond the mobile phone (101), and/or the mobile application (102), and may perform other functions beyond those disclosed.

In one or more embodiments of the invention, a threat type engine (117) is configured to determine a threat type. The threat type may be derived using the location data (103), the motion data (104), the time data (106), and the normal behavior data (132). The threat type is a categorization of a threat. For example, a threat type may be "unsafe neighborhood", "late driving", "extreme movement", "extreme weather", "traveling long distance from home". These may be adjusted based on the preferences of the user. Each of these threat types may also be associated with a numeric score uniquely identifying the threat type. The threat type engine (117) may receive the location data (103), the motion data (104), the time data (106), and the normal behavior data (132) from the mobile phone (101), the mobile application (102), and/or the data repository (131). After receiving the data, the threat type engine (117) may process (i.e. modify, transform, format) the location data (103), the motion data (104), the time data (106), and the normal behavior data (132), and then transmit these data to the safety score engine (118) for further processing. In parallel, the threat type engine (117) may pass control of the system (100) to any other engine. Those skilled in the art will appreciate that the threat type engine (117) may receive the location data (103), the motion data (104), the time data (106), and the normal behavior data (132) from other entities beyond the mobile phone (101), the mobile application (102), and/or the data repository (131), and may perform other functions beyond those disclosed.

In one or more embodiments of the invention, a safety score engine (118) is configured to calculate a safety score for the user of the mobile phone (101 and/or the mobile application (102). The safety score may be derived using the abnormality score, the confidence score, the threat score, and the threat type. The safety score is a numeric representation of the safety of the user. The safety score may be on a scale of 0 (e.g. extremely unsafe) to 100 (e.g. extremely safe), and may be shown to the user on a scale of 0 (e.g. extremely unsafe) to 10 (e.g. extremely safe). In some embodiments, the safety score is displayed to the user on the user's mobile device.

The safety score includes a feedback mechanism that improves itself based on historic data. For example, every time the system generates a safety warning incorrectly, and the user identifies this to the system, the safety score will be readjusted based this user feedback. Also, the system has a default weighting of scores that generate the safety score based on what the system assumes the average user would consider unsafe. Behaviors that deviate from the normal behavior of the user would trigger safety events. For example, if a user is driving later than when he typically drives, the system will reduce the safety score.

The safety score engine (118) may receive the abnormality score, the confidence score, the threat score, and the threat type from the threat type engine (117), and/or any other engine of the safety application (111). After receiving the abnormality score, the confidence score, the threat score, and the threat type, the safety score engine (118) may process (i.e. modify, transform, format) these data, and then transmit these data to the safety score threshold engine (119) for further processing. In parallel, the safety score engine (118) may pass control of the system (100) to any other engine. Those skilled in the art will appreciate that the safety score engine (118) may receive the abnormality score, the confidence score, the threat score, and the threat type from other entities beyond the engines of the safety application (111), and may perform other functions beyond those disclosed.

In one or more embodiments of the invention, a safety score threshold engine (119) is configured to determine if the safety score is less than a safety score threshold. The safety score threshold is a numeric quantity below which an action is triggered. If the safety score is less than the safety score threshold, then the system will proactively contact the user to see if they are safe. The safety score threshold engine (119) may receive a safety score threshold from the data repository (131). After receiving the safety score threshold, the safety score threshold engine (119) may process (i.e. modify, transform, format) the safety score threshold, and then transmit the result of the comparison between the safety score and the safety score threshold to the text engine (120) for further processing. In parallel, the safety score threshold engine (119) may pass control of the system (100) to any other engine. Those skilled in the art will appreciate that the safety score threshold engine (119) may receive the safety score threshold from other entities beyond the data repository (131), and may perform other functions beyond those disclosed.

In one or more embodiments of the invention, a text engine (120) is configured to generate and transmit a message (e.g. text message (140)), or a phone call, or an email to the mobile phone (101) of the user requesting a reply. The message may be a text message, or other type of message (e.g. a push notification, a WhatApp message, a Facebook message, an iMessage, an email, etc) to be displayed on the user's mobile device. If the safety score is sufficiently low the system will proactively reach out to the user in danger and request that they verify that they are okay (or indeed in danger). This proactive communication may occur multiple times in an escalating manner (e.g. begin with a push notification "are you ok?" to the mobile phone of the user, and then if no response from the user proceed to an automated phone call to the mobile phone of the user, and then if the user doesn't pick up the call, call another contact of the user, or an emergency responder like the police).

The text engine (120) may receive an indication that the safety score is less than the safety score threshold from the safety score threshold engine (119). After receiving the indication, the text engine (120) may process (i.e. modify, transform, format) the indication, generate the message, and then transmit the message to the mobile phone (101) to initiate a safety process. In parallel, the text engine (120) may pass control of the system (100) to other entities. Those skilled in the art will appreciate that the text engine (120) may receive the indication from other entities beyond the safety score threshold engine (119), and may perform other functions beyond those disclosed.

In one or more embodiments of the invention, the service provider server B (126) is configured to host a data repository (131). The data repository (131) may contain data associated with the safety application (111). The data repository (131) may be a relational database that stores data entries associated with the safety application (111). The data repository (131) may also be a spreadsheet containing data cells associated with the safety application (111). In one or more embodiments of the invention, the data repository (131) may be implemented with many technologies. In another embodiment, the data repository may be located on a user's phone, or may be split between a user's phone and one or more locations hosted by the service provider. The data repository (131) may receive data from various sources, including the safety application (111), and any of the engines of the safety application (111), over a network B (125). After receiving data from the safety application (111), the data repository (131) may process (i.e. modify, transform, format) the data, and then store the data. The data may include location data (103), motion data (104), location data source (105), time data (106), normal behavior data (132), contact data (133), weather data (134), and crime data (135). In one or more embodiments of the invention, location data (103) is the same data found on the mobile phone (101). In one or more embodiments of the invention, motion data (104) is the same data found on the mobile phone (101). In one or more embodiments of the invention, location data source (105) is the same data found on the mobile phone (101). In one or more embodiments of the invention, time data (106) is the same data found on the mobile phone (101).

In one or more embodiments of the invention, normal behavior data (132) is data (e.g. historic data) that describes the normal behavior and routines of the user. For example, historic data may include travel to and/or from home, school, or work. New locations may not exist in the normal behavior data (132), and might indicate that the user is doing something different (e.g. involving a dangerous situation such as an accident, or stolen car. Normal behavior data (132) may include locations (e.g. work), time (e.g. at 9:00 pm), movement (e.g. traveling in a straight forward path at 65 miles per hour), acceleration (e.g. the user is speeding up on foot which may indicate running). Deviations from normal behavior data (132) may indicate a dangerous situation.

In one or more embodiments of the invention, contact data (133) is telephone, email, or other contact information of people in the network of the user (e.g. friends, work colleagues, parents, sisters, brothers, spouse, children, other family), or outside of the network of the user (e.g. emergency response). In one or more embodiments of the invention, weather data (134) is information about the weather at the location of the user, within a geo-fence around the user, or predicted to arrive at the location or anticipated location of the user based on the trajectory and motion data (104) of the user. In one or more embodiments of the invention, crime data (135) is data relating to crime statistics or criminal activities occurring around the location of the user, or the anticipated future location of the user.

Other types of data may also be used to identify deviations from the normal behavior data (132), such as ambient background noise. For example, if the time is 2:00 am, and there is a lot of loud noise occurring in the vicinity of the user (when normal behavior data (132) shows that this is an unusual occurrence), this may indicate and unsafe situation for the user. Additionally, other data sources may be used, such as foursquare to identify the typical density of locations at a certain time of day, and any deviations thereof. Furthermore, sexual offender data may be used to identify deviations from the normal behavior data (132) (e.g. the user is in close proximity to the location of a know sexual offender). Also, traffic conditions may be used to identify deviations from the normal behavior data (132). If a user stops on highway and traffic is bad, then no alert would be generated. Those skilled in the art will appreciate that various other data and data sources may be used such as calendar data, camera, weather, crime data, Wi-Fi data, SSID data, Bluetooth data, device data, light data, compass data, altimeter data (e.g. for vertical position in a building), or any other passive sensor data on a mobile phone.

Those skilled in the art will appreciate that the data repository (131) may receive and store data from other entities beyond the safety application (111), and may perform other functions beyond those disclosed. Further, the service provider server B (126), and the data stored on this server may be owned and/or operated by a service provider (e.g. the owner, developer, and/or manager of safety application (111)). Additionally, all of the operations performed in the engines of safety application (111) may alternatively be performed on the mobile application (102).

In embodiments of the invention, while not illustrated in FIG. 1, both the service provider server A (110) and B (126) may further include a memory storage and a processor. In some embodiments, the memory storage may have instructions stored therein which when executed by the processor causes the processor to signal to the elements (e.g., various engines) of the service provider server A (110) or service provider server B (126) to perform their functions as described above.

The embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 2:
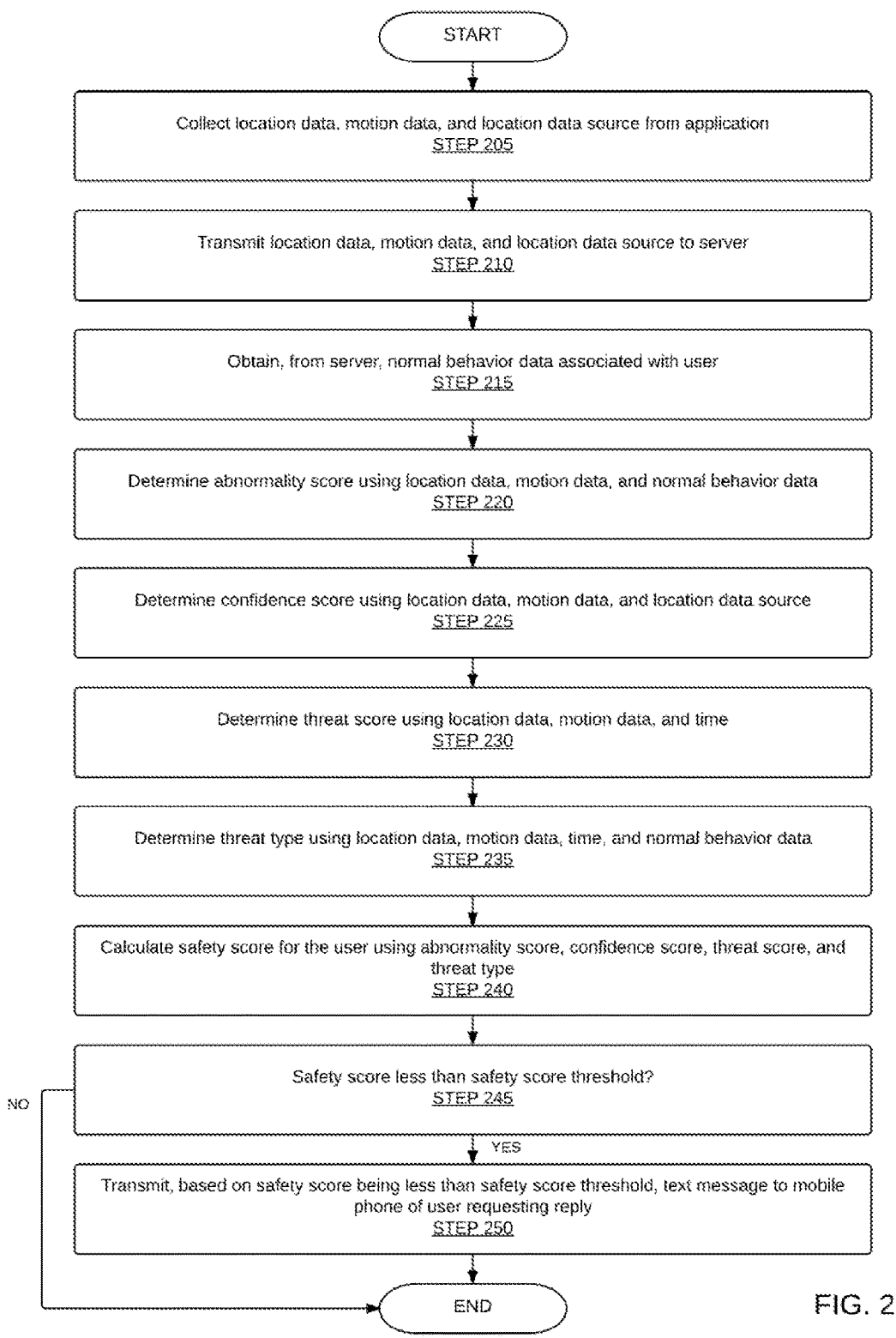
FIG. 2 shows an exemplary flowchart of a method for assessing safety of a user of an application for a proactive response in accordance with one or more embodiments of the invention.

FIG. 2 shows a flowchart in accordance with one or more embodiments of the invention. The process shown in FIG. 2 may be used, for example, with the system (100), to assess the safety of the user. The sequence of steps shown in FIG. 2 may differ among embodiments of the invention, and one or more of the steps may be performed in parallel and/or may be optional. Accordingly, the scope of the invention should not be considered limited to the specific arrangement of steps shown in FIG. 2.

In STEP 205, the mobile application collects the location data, the motion data, and the location data source from the mobile application. For example, this data may indicate that the user is at a particular geographic location, traveling at a certain speed indicating a certain form of travel (e.g. walking, running, by car, by train, by plane), and the source of the location data (e.g. a cell phone tower, or a GPS satellite). In one or more embodiments of the invention, the mobile application may passively collect the location, motion and other contextual data about the user on an ongoing basis (e.g. sampling location every minute, 24/7).

In STEP 210, the mobile application transmits, at a certain time, the location data, the motion data, and the location data source to a server. This transmission may occur with regular frequency (e.g. every minute), or continuously. This transmission may occur without the knowledge and/or intervention of the user, or any action on the user's behalf. Alternatively, the mobile application may perform the following steps in this process locally, without transmitting these data to the server. In one or more embodiments of the invention, the data may be transmitted for smoothening, filtering, aggregation, and/or normalization.

In STEP 215, the mobile application obtains, from the server, a normal behavior data associated with the user. In one or more embodiments of the invention, the normal behavior is data that describes the actions of the user in situations determined to be normal, and may be described in the form of motion, location, and time.

In STEP 220, the mobile application determines, using the location data, the motion data, and the normal behavior data, an abnormality score. In one or more embodiments of the invention, the abnormality score may quantify the degree to which the user is in an abnormal situation as compared to the user's normal behavior (e.g. defined by the normal behavior data).

In STEP 225, the mobile application determines, using the location data, the motion data, and the location data source, a confidence score. In one or more embodiments of the invention, the confidence score indicates the quality of the data.

In STEP 230, the mobile application determines, using the location data, the motion data, and the time, a threat score. In one or more embodiments of the invention, the threat score indicates how threatening a situation the user is in.

In STEP 235, the mobile application determines, using the location data, the motion data, the time, and the normal behavior data, a threat type. In one or more embodiments of the invention, the threat type indicates the type of threat that the user is facing (e.g. running from an assailant, close to a wildfire, speeding on the freeway dangerously).

In STEP 240, the mobile application calculates, using abnormality score, the confidence score, the threat score, and the threat type, a safety score for the user. In one or more embodiments of the invention, the safety score indicates how safe the user is in their current environment and situation.

In STEP 245, the mobile application determines if the safety score is less than a safety score threshold. If the safety score is less than the safety score threshold, this indicates that the user in a dangerous situation, and the process proceeds to STEP 250.

In STEP 250, the mobile application transmits, based on the safety score being less than the safety score threshold, an alert message to the mobile phone of the user requesting a reply. If the user does not verify he is okay after a designated period of time (e.g. immediately or 20 minutes), then another proactive alert may be sent out to the designated contacts of that user. This alert may be in the form of a phone call (e.g. connected to a call center) or a push notification. Furthermore, the alert may be executed through a third party partner system (e.g. a message in Whatsapp, WeChat, or Snapchat, or posting on the user's Facebook wall to friends). User feedback may also be incorporated into the system. For example, if the system generated an alert that says its unsafe, and the user indicates that he/she is in fact safe, then the system may integrate this data into the normal behavior data, and the safety score may be modified. Therefore, the algorithm that generates the safety score may change based on feedback from the user.

Figure 3:
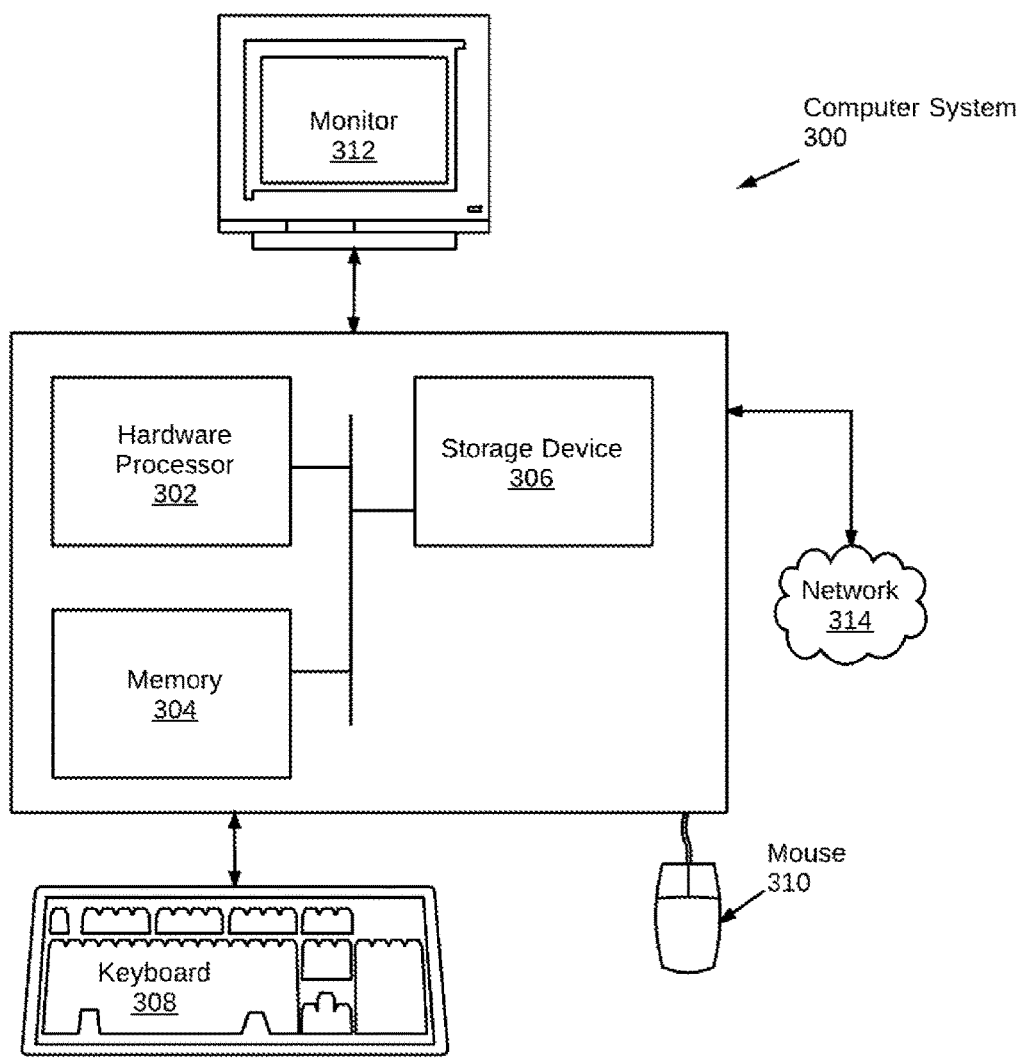
FIG. 3 shows a computer system in which an embodiment of the invention may be implemented.

Embodiments of the invention may be implemented on virtually any type of computer regardless of the platform being used. For example, as shown in FIG. 3, a computer system (300) includes one or more processor(s) (302), an associated memory (304) (e.g. random access memory (RAM), cache memory, flash memory, etc.), a storage device (306) (e.g. a hard disk, an optical drive such as a compact disk drive or digital video disk (DVD) drive, a flash memory stick, etc.), and numerous other elements and functionalities typical of today's computers (not shown). In one or more embodiments of the invention, the processor (302) is hardware. For example, the processor may be an integrated circuit. The computer system (300) may also include input means, such as a keyboard (308), a mouse (310), or a microphone (not shown). Further, the computer system (300) may include output means, such as a monitor (312) (e.g. a liquid crystal display (LCD), a plasma display, or cathode ray tube (CRT) monitor). The computer system (300) may be connected to a network (314) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, the computer system (300) includes at least the minimal processing, input, and/or output means necessary to practice embodiments of the invention.

Further, in one or more embodiments of the invention, one or more elements of the aforementioned computer system (300) may be located at a remote location and connected to the other elements over a network. Further, embodiments of the invention may be implemented on a distributed system having a plurality of nodes, where each portion of the invention (e.g. the mobile application, the safety application, the data repository) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration known to practitioners of the art. These modifications and alternate practices, though not explicitly described, are covered under the current application. The practice of the invention is further covered within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A computer-implemented method for assessing and alerting safety of a user of a mobile device, comprising:
receiving, from a data repository, normal behavior data associated with the user;
generating an abnormality score based on the normal behavior data and location data of the mobile device;
generating a threat score based on the abnormality score, wherein the threat score indicates a degree of physical threat to the user;
generating a safety score for the user based on the threat score and a threat type; and
when the safety score is less than a safety score threshold, generating an alert message to be displayed on the mobile device, wherein the alert message includes a request for a reply from the user.

2. The method of claim 1, further comprising:
receiving the location data from the mobile device; and
generating the threat type based on the location data, time data, and the normal behavior data.

3. The method of claim 1, wherein generating the abnormality score is further based on a confidence score computed using at least the location data and a location data source from the mobile device.

4. The method of claim 1, wherein when the reply is not received from the user within a period of time, initiating a first alert telephone call to the user.

5. The method of claim 4, wherein when the first alert telephone call fails to connect with the user, initiating a second alert telephone call to an emergency contact associated with the user.

6. The method of claim 1, further comprising: using motion data received from the mobile device to generate at least one of: the abnormality score, the threat score, the threat type, or the safety score.

7. The method of claim 1, further comprising: receiving one or more location data sources and using the one or more location data sources to generate at least one of: the abnormality score, the threat score, the threat type, or the safety score.

8. The method of claim 1,
further comprising using at least the location data and time data to generate a confidence score; and
wherein generating the abnormality score is further based on the confidence score.

9. The method of claim 1,
further comprising receiving crime data related to the location data; and
wherein generating the safety score for the user is further based on the crime data.

10. The method of claim 1,
further comprising receiving weather data related to the location data; and
wherein generating the safety score for the user is further based on the weather data.

11. The method of claim 1, further comprising:
receiving the reply from the user indicating that the user is safe;
updating the safety score including increasing the safety score; and
adjusting the normal behavior data with time data and the location data.

12. A non-transitory computer-readable storage medium having stored thereon instructions which when executed by a processor causes the processor to perform a method for assessing and alerting safety of a user of a mobile device, the method comprising:
receiving location data from the mobile device;
receiving, from a data repository, normal behavior data associated with the user;
determining a degree of abnormality based on time data, the location data, and the normal behavior data;
generating a safety score for the user based on the degree of abnormality, wherein the safety score is a representation of physical safety of the user; and
when the safety score is less than a safety score threshold, generating an alert message.

13. The non-transitory computer-readable storage medium of claim 12, wherein the alert message is displayed on the mobile device, wherein the alert message includes a request for a reply from the user.

14. The non-transitory computer-readable storage medium of claim 13, wherein when the user fails to reply to the alert message within a period of time, initiating a first alert telephone call to the user.

15. The non-transitory computer-readable storage medium of claim 14, wherein when the first alert telephone call fails to connect with the user, initiating a second alert telephone call to an emergency contact associated with the user.

16. The non-transitory computer-readable storage medium of claim 13, wherein when the user fails to reply to the alert message within a period of time, transmitting the alert message to an emergency contact associated with the user.

17. The non-transitory computer-readable storage medium of claim 12, wherein determining the degree of abnormality is further based on a confidence score computed using at least the location data and a location data source from the mobile device.

18. A data processing system for assessing and alerting safety of a user of a mobile device, comprising:
a processor; and
a memory coupled to the processor to store instructions, which when executed by the processor, cause the processor to perform operations, the operations including
generating and storing normal behavior data associated with the user, wherein the normal behavior data is generated based on at least one of: time data, location data, or motion data;
generating an abnormality score based on (i) one or more of: the location data, the time data or the motion data, and (ii) the normal behavior data;
generating a safety score for the user based at least on the abnormality score, wherein the safety score is a representation of physical safety of the user; and
when the safety score is less than a safety score threshold, generating and transmitting an alert message to be displayed on the mobile device, wherein the alert message includes a request for a reply from the user.

19. The system of claim 18, wherein generating the abnormality score is further based on a confidence score computed using at least the location data and a location data source from the mobile device.

20. The system of claim 18, wherein generating the safety score for the user is further based on a threat score and a threat type.

21. The system of claim 20, wherein the operations further include using motion data received from the mobile device to generate at least one of: the abnormality score, the threat score, the threat type, or the safety score.

22. The system of claim 20, wherein the operations further include receiving one or more location data sources, and using the one or more location data sources to generate at least one of: the abnormality score, the threat score, the threat type, or the safety score.

23. The system of claim 18, wherein the operations further include when the reply is not received from the user within a period of time, initiating a first alert telephone call to the user.

24. The system of claim 23, wherein the operations further include when the first alert telephone call fails to connect with the user, initiating a second alert telephone call to an emergency contact associated with the user.

25. The system of claim 18,
wherein the operations further include using at least the location data and the time data to generate a confidence score; and
wherein generating the abnormality score is further based on the confidence score.

26. The system of claim 18,
wherein the operations further include receiving crime data related to the location data, and
wherein generating the safety score for the user is further based on the crime data.

27. The system of claim 18,
wherein the operations further include receiving weather data related to the location data, and
wherein generating the safety score for the user is further based on the weather data.

28. The system of claim 18, wherein the operations further include:

receiving the reply from the user indicating that the user is safe;
updating the safety score including increasing the safety score; and
adjusting the normal behavior data with the time data and the location data.

* * * * *